United States Patent
Wang

(10) Patent No.: US 10,869,354 B2
(45) Date of Patent: Dec. 15, 2020

(54) STATUS DETECTION OF RRC CONNECTION

(71) Applicant: TELEFONAKTIEBOLAGET LM ERICSSON (PUBL), Stockholm (SE)

(72) Inventor: Jun Wang, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/094,332

(22) PCT Filed: Apr. 21, 2016

(86) PCT No.: PCT/IB2016/052284
§ 371 (c)(1),
(2) Date: Oct. 17, 2018

(87) PCT Pub. No.: WO2017/182845
PCT Pub. Date: Oct. 26, 2017

(65) Prior Publication Data
US 2019/0124714 A1    Apr. 25, 2019

(51) Int. Cl.
*H04W 76/27*    (2018.01)
*H04W 76/30*    (2018.01)
(Continued)

(52) U.S. Cl.
CPC .......... *H04W 76/27* (2018.02); *H04W 76/10* (2018.02); *H04W 76/30* (2018.02); *H04W 80/02* (2013.01)

(58) Field of Classification Search
CPC ..... H04W 76/27; H04W 76/30; H04W 76/10; H04W 80/02
See application file for complete search history.

(56) References Cited

U.S. PATENT DOCUMENTS 9,226,256 B2   12/2015   Velev
2007/0123266 A1   5/2007   Polisetty et al.
(Continued)

FOREIGN PATENT DOCUMENTS

EP   2557890 A1   2/2013
EP   2844023 A1   3/2015

OTHER PUBLICATIONS

3GPP TS 36.331 V13.0.0, release 13; Dec. 2015; 507 pages.
3GPP TS 36.321 V13.0.0, release 13; Dec. 2015; 82 pages.
3GPP TS 25.331 V13.1.0, release 13; Dec. 2015; 2266 pages.

*Primary Examiner* — Duc C Ho
(74) *Attorney, Agent, or Firm* — Ericsson Inc.

(57) ABSTRACT

Techniques are provided to determine the status of a radio resource control (RRC) connection between a base station and a mobile terminal in a wireless communication system. According to some aspects, a base station transmits a first message to the mobile terminal, the first message comprising instructions which, upon being executed by the mobile terminal, would cause the establishment, the modification, or the release of the RRC connection between the mobile terminal and the base station. The base station subsequently transmits a second message to the mobile terminal, the second message comprising instructions which, upon being executed by the mobile terminal, would force the mobile terminal to transmit a response to the base station. The base station then determines the status of the RRC connection between the mobile terminal and the base station based, at least in part, on the presence or absence of the response from the mobile terminal.

18 Claims, 10 Drawing Sheets

(51) Int. Cl.
*H04W 76/10* (2018.01)
*H04W 80/02* (2009.01)

(56) References Cited

U.S. PATENT DOCUMENTS

| | | |
|---|---|---|
| 2008/0170522 A1 | 7/2008 | Sammour et al. |
| 2012/0082105 A1 | 4/2012 | Hwang et al. |
| 2012/0163313 A1 | 6/2012 | Jung et al. |
| 2013/0142052 A1* | 6/2013 | Burbidge .............. H04W 76/18 370/242 |
| 2013/0260810 A1* | 10/2013 | Rayavarapu .......... H04W 76/19 455/509 |
| 2014/0348091 A1* | 11/2014 | Seo ....................... H04L 1/1893 370/329 |
| 2015/0117398 A1 | 4/2015 | Yang et al. |
| 2015/0237672 A1 | 8/2015 | Kanamarlapudi et al. |
| 2016/0165642 A1* | 6/2016 | Lunden ................. H04W 72/04 455/450 |
| 2017/0215142 A1* | 7/2017 | Kim ...................... H04W 24/02 |

\* cited by examiner

STATUS DETECTION OF RRC CONNECTION

TECHNICAL FIELD

The present description generally relates to wireless communication systems and more particularly relates to the management of connections in wireless communication systems.

BACKGROUND

In wireless communication systems, communications between mobile terminals and base stations typically occur using a series of communication protocols which are arranged as layers, each layer being responsible for specific functionalities. In wireless communication systems operating according to the Third Generation Partnership Project, 3GPP, Long Term Evolution, LTE, standards for instance, the various layers of the radio interface protocols between the base stations and the mobile terminals can be classified into a first layer (layer 1 or L1), a second layer (layer 2 or L2), and a third layer (layer 3 or L3), each layer comprising one or more layers.

Layer 1, which is the lowest layer, comprises the physical (PHY) layer which controls the transfer of data using a physical channel (or radio interface) between the base station and the mobile terminal. Layer 2 comprises a medium access control (MAC) layer, a radio link control (RLC) layer, and a packet data convergence protocol (PDCP) layer. Finally, layer 3 comprises the radio resource control (RRC) layer. The RRC layer controls the logical channel, the transport channel and the physical channel in relation with the establishment, reconfiguration and release of radio bearers. The RRC layer controls the radio resources between the base station and the mobile terminal via the exchange of RRC messages between the base station and the mobile terminal.

As shown in FIG. 1, which illustrates the protocol stack of the radio interface protocols for the control plane according to LTE, when the RRC layer of the base station transmits an RRC message to the RRC layer of the mobile terminal, the RRC message generated by the RRC layer of the base station is passed down to the underlying layers to be further processed (e.g. ciphered, segmented, multiplexed, etc.) before being transmitted over the air interface to the mobile terminal via the PHY layer. At the mobile terminal, the message received at the PHY layer moves in the opposite direction from the PHY layer to the RRC layer.

To monitor the successful transmission of RRC messages, the RRC layer relies on retransmission mechanisms operated by some of the lower layers. For instance, the RLC layer operates an automatic repeat request (ARQ) retransmission mechanism which retransmits the whole message when the receiving RLC layer cannot decode the received message. For its part, the MAC layer operates a hybrid automatic repeat request (HARQ) retransmission mechanism which retransmits only part of the message when the receiving MAC layer cannot decode the received message.

The RRC layer plays in important role in the radio interface protocols as it is the layer responsible for managing and controlling the radio resources between the base station and the mobile terminal. Despite the existence of explicit RRC layer signaling and RLC and MAC layers retransmission mechanisms however, in some instance, the RRC layer may not know the exact status of an RRC connection after the transmission of an RRC message. Without adequate knowledge of the status of the RRC connection between the base station and the mobile terminal, the RRC layer of the base station, and/or of the mobile terminal, may be unable to properly control the radio resources.

SUMMARY

Some embodiments provide techniques to determine the status of a radio resource control (RRC) connection between a base station and a mobile terminal in a wireless communication system. According to the described techniques, subsequent to the transmission of a first message comprising instructions which, upon being executed by the mobile terminal, would cause the RRC connection to be established, modified, or release, the base station further transmit a second message comprising instructions which, upon being executed by the mobile terminal, would force the mobile terminal to transmit a response. The base station may then determine the status of the RRC connection based, at least in part, on the presence or absence of a response to the second message. By being able to ascertain the status of the RRC connection, the base station may perform specific actions.

According to one aspect, some embodiments include a method to be performed at a base station for determining the status of a radio resource control, RRC, connection between a mobile terminal and the base station, the method comprising transmitting a first message to the mobile terminal, the first message comprising instructions which, upon being executed by the mobile terminal, would cause the establishment, the modification, or the release of the RRC connection between the mobile terminal and the base station, transmitting a second message to the mobile terminal, the second message comprising instructions which, upon being executed by the mobile terminal, would force the mobile terminal to transmit a response to the base station, and determining the status of the RRC connection between the mobile terminal and the base station based, at least in part, on an absence or a presence of the response from the mobile terminal.

In some embodiments, the first message may comprise instructions which, upon being executed by the mobile terminal, would cause the establishment of the RRC connection between the mobile terminal and the base station. In some embodiments, the first message may be an RRC message such as an RRCConnectionSetup message. In some embodiments, upon determining the absence of the response from the mobile terminal, the method may comprise determining that the RRC connection between the mobile terminal and the base station is not established. In some embodiments, when it is determined that the RRC connection between the mobile terminal and the base station is not established, the method may further comprise retransmitting, or further retransmitting, the first message.

In some embodiments, the first message may comprise instructions which, upon being executed by the mobile terminal, would cause the release of the RRC connection between the mobile terminal and the base station. In some embodiments, the first message may be an RRC message such as an RRCConnectionRelease message or an RRCConnectionReconfiguration message comprising mobility control information. In some embodiments, upon determining the absence of the response from the mobile terminal, the method may comprise determining that the RRC connection between the mobile terminal and the base station is released. In some embodiments, when it is determined that the RRC connection between the mobile terminal and the base station is released, the method may further comprise refraining from retransmitting, or further retransmitting, the first message, and/or releasing resources associated with the mobile terminal.

In some embodiments, the first message may comprise instructions which, upon being executed by the mobile terminal, would cause the modification of the RRC connection between the mobile terminal and the base station. In some embodiments, the modification of the RRC connection comprises the modification of at least one RRC transmission parameter of the RRC connection. In some embodiments, the first message may be an RRC message such as RRC-ConnectionReconfiguration message. In some embodiments, upon determining the absence of the response from the mobile terminal, the method may comprise determining that the RRC connection between the mobile terminal and the base station comprises is desynchronized or otherwise no longer synchronized. In some embodiments, when it is determined that the RRC connection between the mobile terminal and the base station is desynchronized, the method may further comprise restoring the previous RRC transmission parameters and/or retransmitting, or further retransmitting, the first message using the previous RRC transmission parameters.

In some embodiments, the method may comprise, or further comprise, determining whether at least one first condition is met before transmitting the second message to the mobile terminal. In some embodiments, the at least one first condition comprises the reception of an acknowledgement of the reception of the first message such as a Hybrid Automatic Repeat Request (HARQ) acknowledgement of the first message. In some embodiments, the at least one first condition may alternatively or additionally comprise the expiration of a first timer.

In some embodiments, the method may comprise, or further comprise, determining whether at least one second condition is met before determining the status of the RRC connection between the mobile terminal and the base station. In some embodiments, the at least one second condition may comprise the reception of the response from the mobile terminal. In some embodiments, the at least one second condition may alternatively or additionally comprise the expiration of a second timer.

In some embodiments, the second message may be a downlink control channel message such as a Physical Downlink Control Channel (PDCCH) message. In some embodiments, the downlink control message may comprise an uplink scheduling grant.

According to another aspect, some embodiments include a base station configured to perform one or more base station functionalities as described herein.

In some embodiments, the base station may comprise a communication interface configured to communicate with one or more mobile terminals and/or with one or more network nodes (e.g. other base stations, core network nodes, etc.), and processing circuitry operatively connected to the communication interface, the processing circuitry being configured to perform one or more base station functionalities as described herein. In some embodiments, the processing circuitry may comprise one or more processor and one or more memory storing instructions which, upon being executed by the processor, configure the processor to perform one or more base station functionalities as described herein.

In some embodiments, the base station may comprise one or more functional modules configured to perform one or more base station functionalities as described herein.

According to another aspect, some embodiments include a non-transitory computer-readable medium storing a computer program product comprising instructions which, upon being executed by a processor of the base station, configure the processor to perform one or more base station functionalities as described herein.

Other aspects and features will become apparent to those ordinarily skilled in the art upon review of the following description of exemplary embodiments in conjunction with the accompanying figures.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein.

DETAILED DESCRIPTION

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description. In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

According to exemplary embodiments, a base station in a wireless communication system may use lower layer messages in order to confirm, or infirm, whether a mobile terminal has properly received and processed higher layer messages. For example, in some embodiments, the base station may transmit a physical layer message (or PHY messages) in order to confirm, or infirm, that the mobile terminal has properly received and processed a radio resource control layer message (or RRC message). While the description herein is generally not limited to any particular wireless communication standard, it may be helpful to describe at least some embodiments in the context of the 3GPP LTE standards. It will be appreciated however that references to the 3GPP LTE standards and/or to terminology used therein should not be construed as limiting the present description to such standards. Understandably, embodiments may be implemented or otherwise deployed using other standards or technologies.

Figure 1:
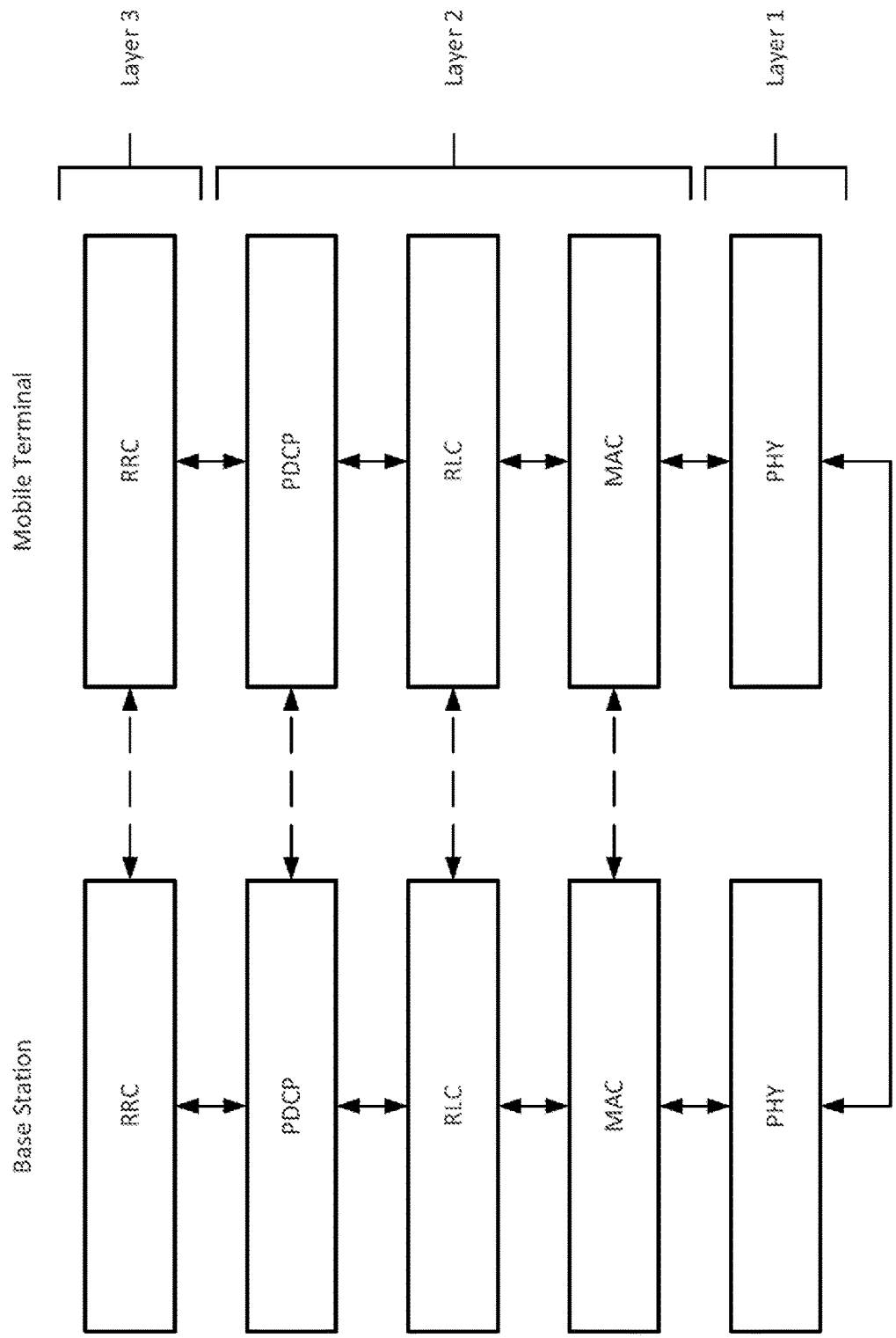
FIG. 1 illustrates the protocol stack for the control plane according to LTE.
Figure 2:
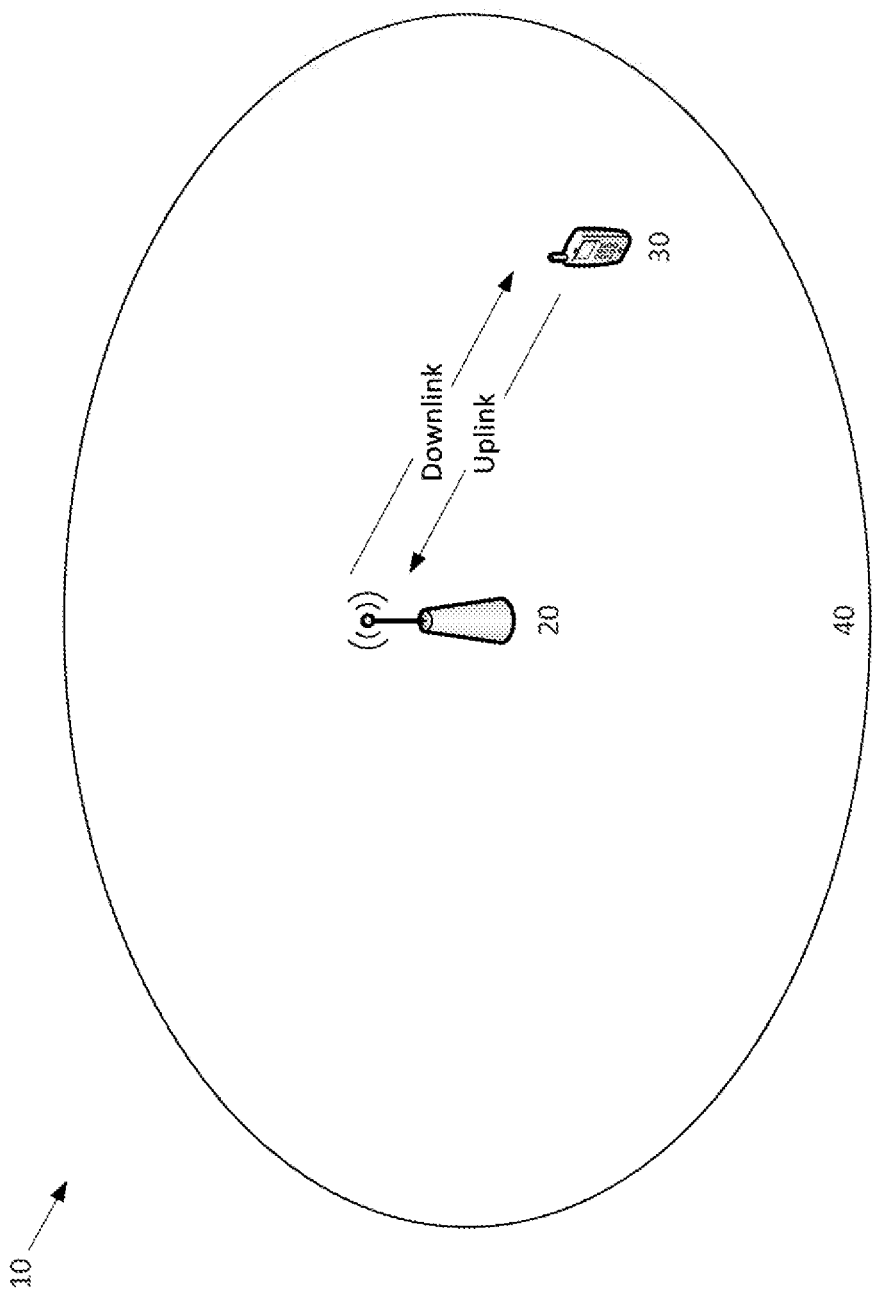
FIG. 2 illustrates an exemplary wireless communication system in accordance with some embodiments.

Turning now to FIG. 2, an exemplary wireless communication system 10 in which various exemplary embodiments can be implemented is illustrated. Wireless communication system 10 comprises a base station 20 in communication with a mobile terminal 30 over an air interface. In LTE, the base station 20 is generally referred to as an evolved, or enhanced, NodeB or eNB, while the mobile terminal 30 is generally referred to as a user equipment or UE. The generic terms base station and mobile terminal will be used herein except where otherwise noted. Base station 20 generally defines a cell, or sector, 40 which is the geographical area over which the base station 20 provides wireless access to mobile terminals such as mobile terminal 30. Though not shown, the base station 20 may be connected to other base stations 20 via a base station to base station interface (an X2 interface in LTE), and to a core network via a base station to core network interface (an S1 interface in LTE).

Base station 20 and mobile terminal 30 can exchange control and user data over one or more downlink channels and over one or more uplink channels. Still, in wireless communication systems, mobile terminal 30 generally needs to be connected or otherwise attached to the base station 20 in order to be able to exchange control and user data over the downlink and uplink channels. This connection can be made via the establishment of an RRC connection between the base station 20 and the mobile terminal 30. The establishment of an RRC connection generally involves the establishment of various radio bearers which support the different downlink and uplink channels. When a mobile terminal 30 is connected to the base station 20 via an RRC connection, the mobile terminal 30 may be said to be RRC_CONNECTED or in the RRC_CONNECTED state. Conversely, when a mobile terminal 30 is not connected to any base station 20 via an RRC connection, the mobile terminal 30 may be said to be RRC_IDLE or in the RRC_IDLE state.

In wireless communication systems operating according to the LTE standards, the establishment, management, and release of the RRC connection between the base station 20 and the mobile terminal 30 are managed through the exchange of various RRC messages which are defined, for instance, in 3GPP TS 36.331.

When the base station 20 has to transmit an RRC message to the mobile terminal 30, the RRC message is processed by the lower layers of the protocol stack, including the packet data convergence protocol, PDCP, layer, the radio link control, RLC, layer, the media access control, MAC, layer, and the physical, PHY, layer.

While the mobile terminal 30 is not yet connected to the base station 20, i.e. while the mobile terminal 30 is RRC_IDLE, the mobile terminal 30 may decide to attach to the base station 20. To do so, the mobile terminal 30 first transmits an RRC message comprising a request to establish an RRC connection with the base station 20 (e.g. RRCConnectionRequest message). Upon receiving the RRC connection request message, the base station 20 then transmits another RRC message, that is an RRC message comprising instructions which would result in the RRC connection being established (e.g. RRCConnectionSetup message). However, the RRC message comprising instructions which would result in the RRC connection being established (hereafter an RRC connection setup message) is transported by the RLC layer in unacknowledged mode (UM) mode. In other words, when the mobile terminal 30 receive an RRC connection setup message, the mobile terminal 30 cannot acknowledge the reception of the RRC connection setup message to the base station 20 through an RLC acknowledgement. Hence, the base station 20 is left without acknowledgement which could be used by the base station 20 to determine the status of the RRC connection. On the one hand, if the mobile terminal 30 does receive and process the RRC connection setup message, the mobile terminal 30 subsequently replies with an RRC message indicating the completion of the establishment of the RRC connection (e.g. RRCConnectionSetupComplete message). On the other hand, if the mobile terminal 30 does not receive the RRC connection setup message, the mobile terminal 30 does not transmit any RRC message back to the base station 20, leaving the base station 20 unaware of the status of the RRC connection. Understandably, while the base station 20 remains unaware of the status of the RRC connection during its establishment, the base station 20 may maintain mobile terminal information (e.g. UEContext information) until, for instance a guard timer expires. Maintaining mobile terminal information consumes valuable resources which could be used for other mobile terminals 30.

While the mobile terminal 30 is connected to the base station 20, i.e. while the mobile terminal 30 is RRC_CONNECTED, the base station 20 may transmit an RRC message to the mobile terminal 30 to change or modify one or more RRC connection parameters of the existing RRC connection (hereafter an RRC connection modification message). The connection parameters used in an existing RRC connection should generally be the same (i.e. synchronized) at both the base station 20 and the mobile terminal 30 for the RRC connection to work properly. Hence, when the base station 20 transmit an RRC connection modification message, the base station 20 may remain unaware of the exact status of the RRC connection while the mobile terminal 30 receives and processes the RRC connection modification message. In other words, after having transmitted an RRC connection modification message, the base station 20 may not know when to switch to the new RRC connection parameters since there is no explicit mechanism for the mobile terminal 30 to notify the base station 20 that the mobile terminal 30 has properly received and processed the RRC connection modification message and is ready to use the new RRC connection parameters. When the RRC connection parameters are not the same at both ends of the RRC connection, communication between the mobile terminal 30 and base station 20 may fail, forcing the re-establishment of the RRC connection.

While the mobile terminal 30 is connected to the base station 20, it may also occur that the mobile terminal 30 receives an RRC message comprising instructions which would result in the RRC connection being released (i.e. severed, broken, etc.) (hereafter an RRC disconnection message). Such RRC disconnection message may include an RRC message comprising a handover command (e.g. RRCConnectionReconfiguration message with mobility control information) or an RRC message comprising an explicit connection release command (e.g. RRCConnectionRelease message). Upon receiving such RRC disconnection message, the mobile terminal 30 may immediately release the existing RRC connection without explicit acknowledgement. Moreover, even if the mobile terminal 30 has time to feedback the explicit acknowledgement before it releases the RRC connection, in some instances, the base station 20 may not receive the acknowledgement of the reception of the RRC message. For instance, when the RRC disconnection message transmitted to the mobile terminal 30 contains a handover command (e.g. RRCConnectionReconfiguration message with mobility control information), section 5.3.5.4 of 3GPP TS 36.331 specifies that the mobile terminal 30 should perform the handover as soon as possible following the reception of the RRC message triggering the handover, which could be before the mobile terminal 30 can confirm the successful reception of the RRC message. Similarly, when the RRC disconnection message transmitted to the mobile terminal 30 contains an explicit connection release command (e.g. RRCConnectionRelease message), section 5.3.8.3 of 3GPP TS 36.331 specifies that the mobile terminal 30 should wait the shorter of either a predetermined amount of time (e.g. 60 ms) or for the lower layers (e.g. MAC layer, RLC layer) to acknowledge the receipt of the RRC message. In some circumstances however, the predetermined amount of waiting time may expire before the lower layers are able to successfully transmit the acknowledgement of the RRC message. Hence, when the mobile terminal 30 receives an RRC disconnection message, the mobile terminal 30 may release the RRC connection before the base station 20 can successfully receive any acknowledgement, thereby leaving the base station 20 unaware of the status of the RRC connection. Understandably, if the base station 20 is unaware of the status of the RRC connection, the base station 20 may continue to retransmit, or further retransmit, the RRC disconnection message until some retransmission limit or other threshold (e.g. a timer) is exceeded. It will be appreciated that when the mobile terminal 30 has already received and processed the RRC message, these retransmissions may consume valuable radio resources.

Hence, upon transmitting RRC messages to the mobile terminal 30 which, upon being executed by the mobile terminal 30, would result in the establishment, the modification or the release of an RRC connection, the base station 20 may take a more active approach in determining the status of the RRC connection. By being able to make an earlier determination of the status of the RRC connection (e.g. established, modified, or released), the base station 20 may undertake specific actions (e.g. retransmit, or further retransmit, the RRC message, refrain from retransmitting, or further retransmitting, the RRC message, switch to modified RRC connection parameters, release the resources associated with the mobile terminal, etc.). In some embodiments, after having transmitted an RRC message to the mobile terminal 30 comprising instructions which would result in an RRC connection being established, modified or released, the base station 20 transmits another message, which may be a PHY control message, comprising instructions which, if received and processed by the mobile terminal 30, would cause or otherwise force the mobile terminal 30 to transmit a response (e.g. a PHY response) to the base station 20. Depending on the presence, or the absence, of a response to the second message, the base station 20 may determine the status, e.g. established, modified, or released, of the RRC connection, and act accordingly.

Figure 3A:
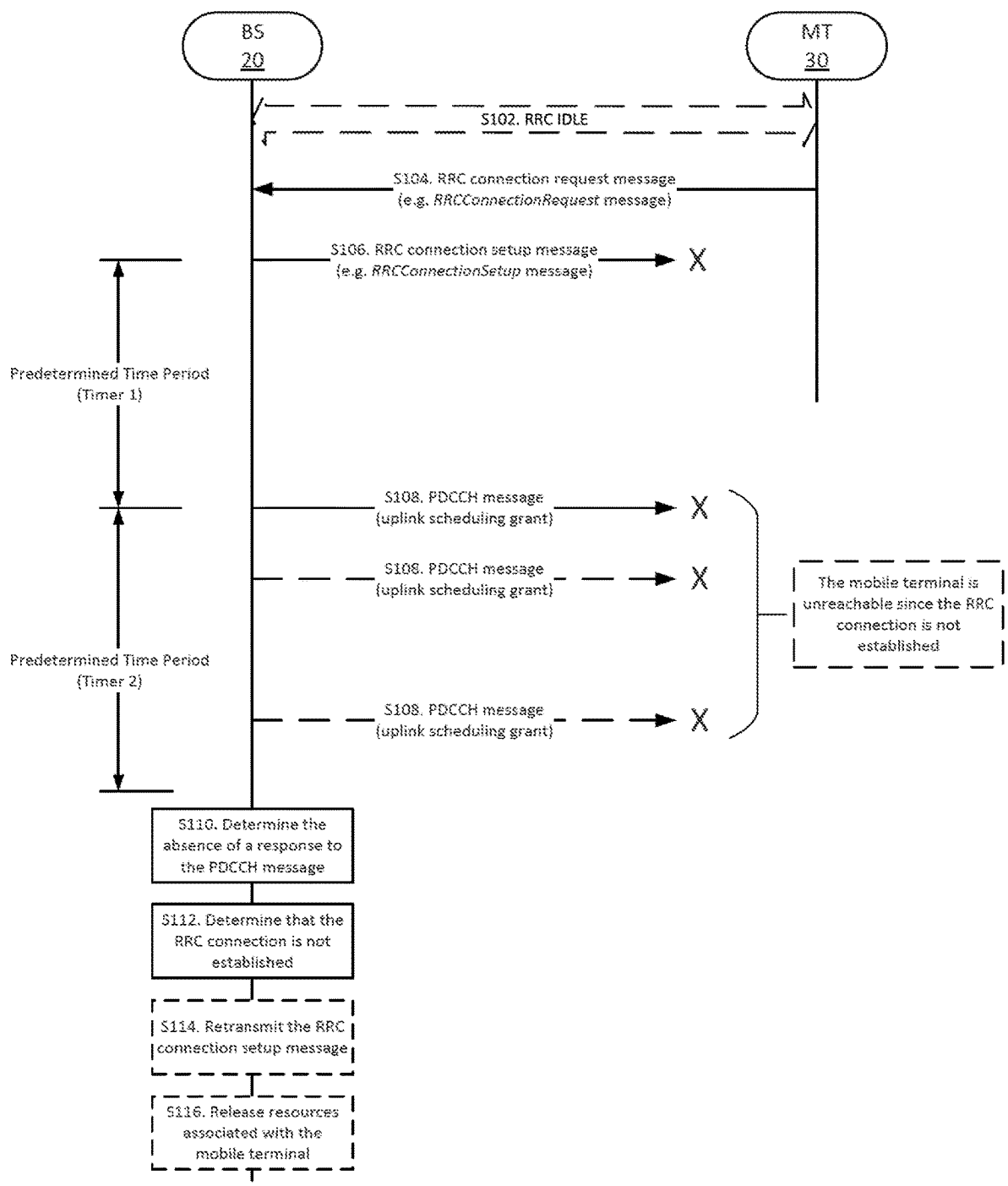
FIGS. 3A to 5B illustrate various signaling diagrams in accordance with some embodiments.

Referring now to FIG. 3A, a signaling diagram of an exemplary embodiment is illustrated. In the illustrated embodiment, the mobile terminal 30 is not connected to the base station 20; the mobile terminal 30 is RRC_IDLE (step S102). At some point, the mobile terminal 30 transmits an RRC message to the base station 20 to establish an RRC connection (step S104), that is an RRC connection request message. The RRC connection request message may be an RRCConnectionRequest message. Upon receiving the RRC connection request message from the mobile terminal 30, and upon determining that the requested RRC connection can be established, the base station 20 transmits an RRC message comprising instructions which, upon being executed by the mobile terminal 30, would result in the establishment of the RRC connection (step S106), that is an RRC connection setup message. The RRC connection setup message may be an RRCConnectionSetup message. In the illustrated embodiment, the RRC connection setup message never reaches the mobile terminal 30. This may be due, for instance, to bad or degrading radio conditions. Regardless, as indicated above, some RRC messages, including RRC connection setup messages, are transported by the RLC layer in unacknowledged mode, resulting in the base station 20 being unable to rely on RLC retransmissions to guarantee the successful reception of the RRC message by the mobile terminal 30.

As illustrated, in order to avoid waiting passively for a response from the mobile terminal 30, the base station 20 may start a first timer (e.g. Timer 1) in the MAC layer upon transmitting the RRC connection setup message. The expiration of the first timer, or the reception of an acknowledgement from the MAC layer (e.g. a HARQ acknowledgement) may be used as a condition or trigger for the base station 20 to transmit a second, lower layer message to the mobile terminal 30 (step S108). This second message comprises instructions which, upon being executed by the mobile terminal 30, would force the mobile terminal 30 to transmit a response to the base station 20.

Hence, as the first timer expires (or as a HARQ acknowledgement is received), the base station 20 transmits the second message to the mobile terminal 30 (step S108). In the illustrated embodiment, the second message is a downlink control channel (e.g. Physical Downlink Control Channel, PDCCH, in LTE) message carrying an uplink scheduling grant indicating when the mobile terminal 30 would be scheduled to transmit the response. Understandably, in the illustrated embodiment, even if the mobile terminal 30 receives the PDCCH carrying the uplink scheduling grant, the mobile terminal 30 will not respond since the mobile terminal 30 cannot decide if the PDCCH message is directed to itself if the RRC connection setup message was not received by mobile terminal 30. To prevent the base station 20 from retransmitting the second message indefinitely, the base station 20 may start a second timer (e.g. Timer 2) upon transmitting the PDCCH message. The expiration of the second timer may be used as a condition or trigger for the base station 20 to determine the status of the RRC connection. In that sense, at the expiration of the second timer, the base station 20 may determine whether the mobile terminal 30 has received the RRC connection setup message or not based on whether the mobile terminal 30 has transmitted a response during the time when the mobile terminal 30 was scheduled to transmit a response. In the illustrated embodiment, the base station 20 determines an absence of response from the mobile terminal 30 within the time period defined by the second timer (step S110). Upon determining the absence of a response, the base station 20 may conclude that the RRC connection between the base station 20 and the mobile terminal 30 has not been established (step 112). Upon reaching this conclusion, the base station 20 may perform certain actions, for instance, retransmitting the RRC connection setup message (step S114). Alternatively, the base station 20 may release the resources associated with the mobile terminal 30 (step S116).

Figure 3B:
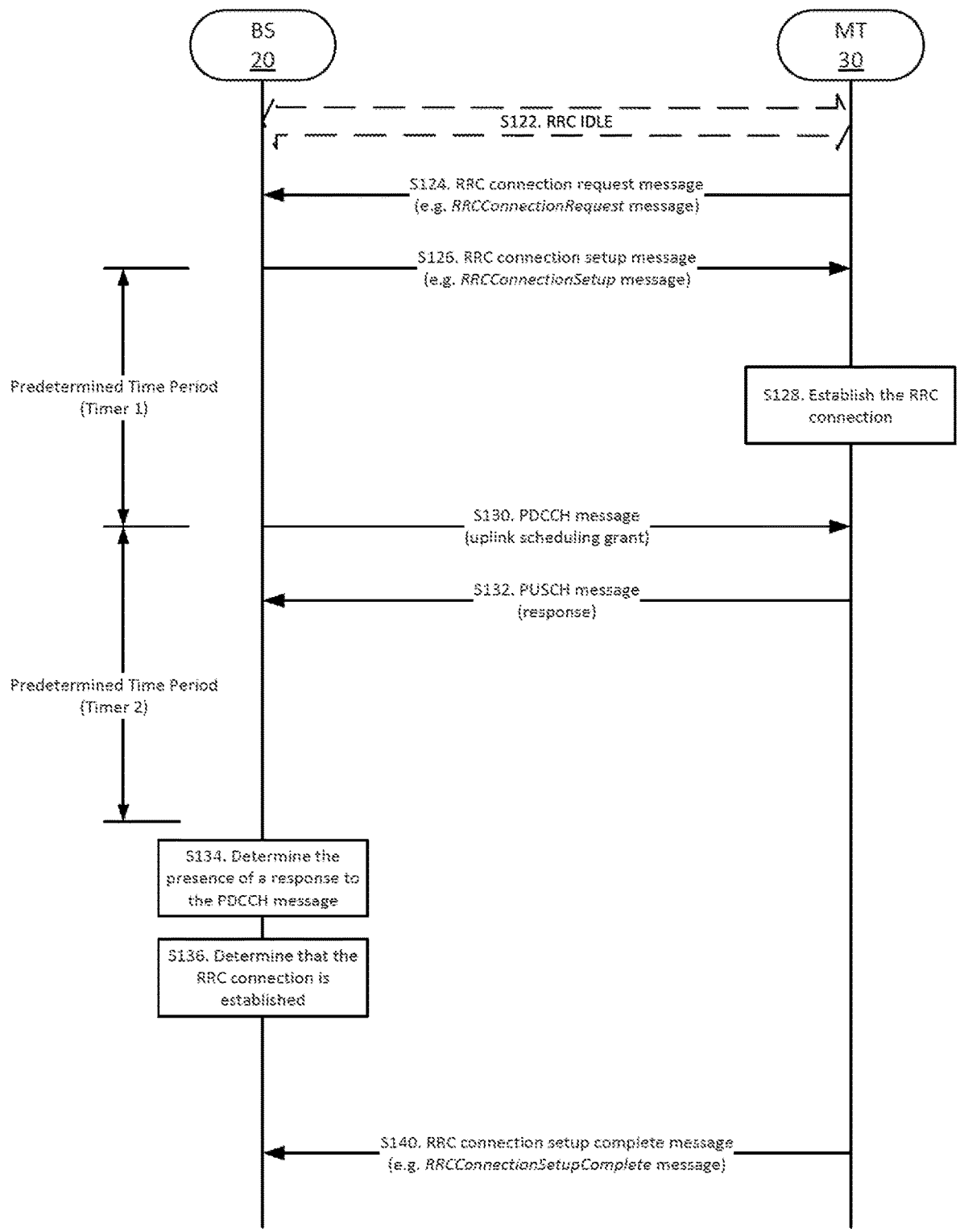

Referring now to FIG. 3B, a signaling diagram of another exemplary embodiment is illustrated. As in FIG. 3A, the mobile terminal 30 is initially not connected to the base station 20 and is therefore RRC_IDLE (step S122). At some point, the mobile terminal 30 transmits a RRC connection request message (e.g. RRCConnectionRequest message) to the base station 20 to initiate the establishment of an RRC connection (step S124). Upon receiving the RRC connection request message, the base station 20 transmits an RRC connection setup message (e.g. RRCConnectionSetup message) to the mobile terminal 30 (step S126). In the illustrated embodiment however, the RRC connection setup message does reach the mobile terminal 30 and the mobile terminal 30 establishes the RRC connection (step S128). As indicated above, the RLC layer at the mobile terminal 30 does not need to acknowledge the reception of the RRC connection setup message. Hence, the base station 20 may learn of the establishment of the RRC connection upon receiving an RRC message confirming the completion of the RRC connection establishment (e.g. RRCConnectionSetupComplete message), which may be some time after the establishment of the RRC connection by the mobile terminal 30 (step S140).

As illustrated, in order to avoid waiting passively for the RRC connection setup complete message from the mobile terminal 30, the base station 20 starts the first timer (e.g. Timer 1) upon initially transmitting the RRC connection setup message. The expiration of the first timer, or the reception of a HARQ acknowledgement, may be used to trigger the base station 20 to transmit the PDCCH message to the mobile terminal 30 (step S130), the PDCCH message comprising the uplink scheduling grant. To prevent the base station 20 from retransmitting the PDCCH message indefinitely, the base station 20 starts the second timer (e.g. Timer 2) upon initially transmitting the PDCCH message. The expiration of the second timer may be used to trigger the base station 20 to determine the status of the RRC connection. In that sense, at the expiration of the second timer, the base station 20 may determine whether the mobile terminal 30 has received the RRC connection setup message or not based on whether the mobile terminal 30 has transmitted a response during the time when the mobile terminal 30 was scheduled to transmit a response. In the illustrated embodiment, the base station 20 does receive a response from the mobile terminal 30 (step S132). The response may be some data transmitted to the base station 20 over a shared uplink channel (Physical Uplink Shared Channel, PUSCH, in LTE). Upon determining the presence of a response (e.g. a PUSCH message) (step S134), the base station 20 may conclude that mobile terminal 30 has received the RRC connection setup message and contention has been successfully resolved (step S136). Upon reaching this conclusion, the base station 20 may perform certain actions, for instance, prepare additional uplink resource for the mobile terminal 30.

In some embodiments, the mobile terminal 30 may start a timer (e.g. timer T300 in LTE) upon transmitting the RRC connection request message to the base station 20. This timer may be used to prevent the mobile station 30 from waiting indefinitely for an RRC connection setup message from the base station 20. Accordingly, in some embodiments, the first and second timers (e.g. Timers 1 and 2) may be chosen such as to be cumulatively shorter (that is the sum of the first and second timers is smaller) than the timer (e.g. timer T300) started at the mobile terminal 30 such that base station 20 may, for instance, proactively retransmit the RRC connection setup message while the timer (e.g. timer T300) is still running if it determines that the RRC connection has failed to be established.

Figure 4A:
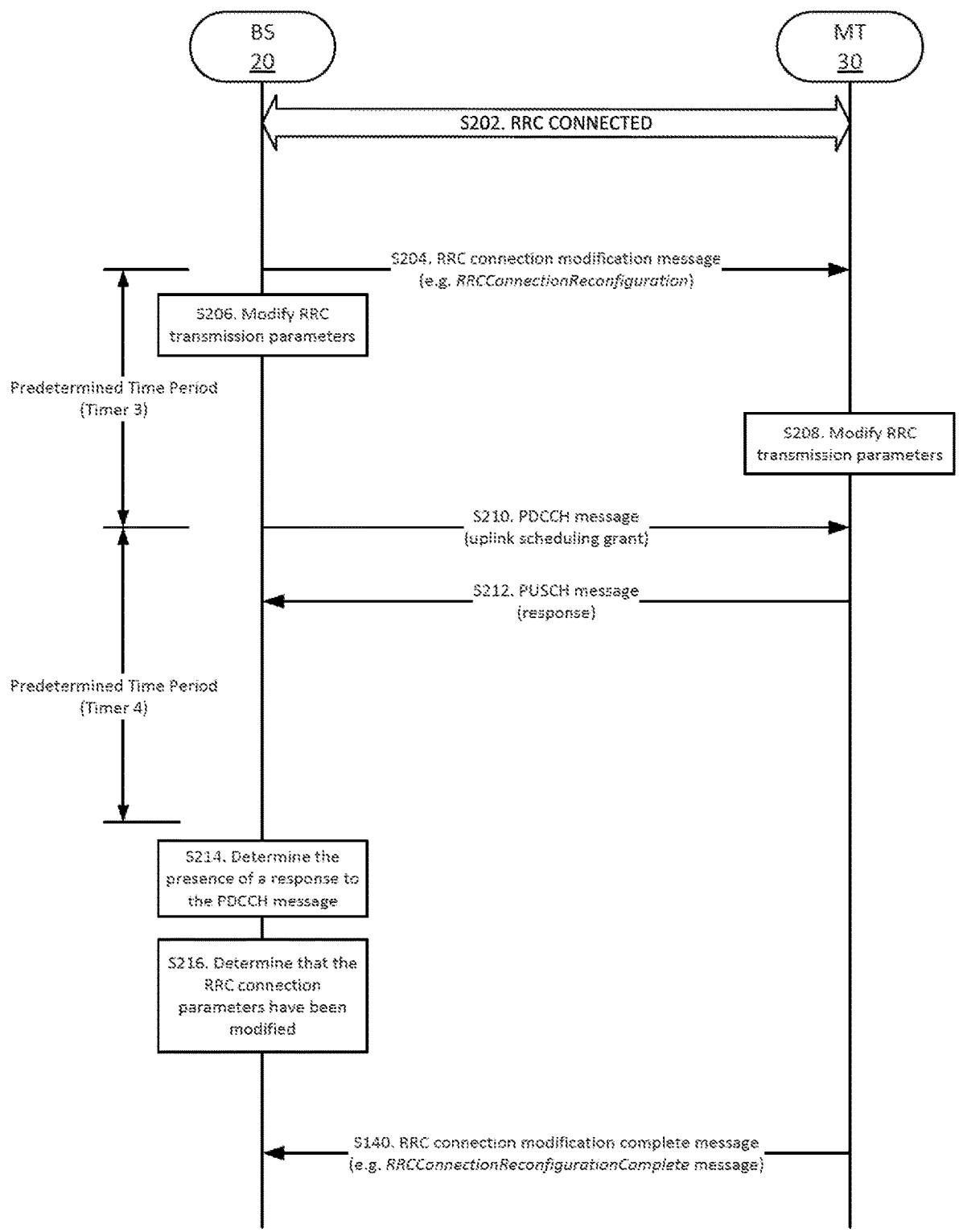

Referring now to FIG. 4A, a signaling diagram of another exemplary embodiment is illustrated. As shown, mobile terminal 30 is connected to the base station 20 and is therefore RRC_CONNECTED (step S202). At some point, the base station 20 transmits an RRC connection modification message (e.g. RRCConnectionReconfiguration message) comprising one or more RRC connection parameters to be modified at the mobile terminal 30 (step S204). It will be appreciated that since the RRC layer manages the radio bearers between the base station 20 and the mobile terminal 30, if the RRC connection parameters are not synchronized between the base station 20 and the mobile terminal 30, the RRC connection may fail. When the base station 20 transmits an RRC connection modification message to the mobile terminal 30 however, the base station 20 does not know when the new RRC connection parameters will be active at the mobile terminal 30 prior to the reception of either an RRC connection modification complete message (e.g. RRCConnectionReconfigurationComplete message), if the modification of the RRC connection parameters was successful, or the reception of an RRC connection re-establishment request message (e.g. RRCConnectionReestablishmentRequest message), if the modification of the RRC connection parameters was not successful.

Hence, as for the establishment of the RRC connection, in order to avoid waiting passively for either the RRC connection reconfiguration complete message or the RRC connection re-establishment request message from the mobile terminal 30, the base station 20 starts a first timer (e.g. Timer 3) upon initially transmitting the RRC connection modification message (step S204) but prior to locally modifying the RRC connection parameters (step S206). The expiration of the first timer, or the reception of a HARQ acknowledgement, may be used as a condition or trigger for the base station 20 to transmit the PDCCH message comprising the uplink scheduling grant to the mobile terminal 30 (step S210), the PDCCH message, which, in this case, is using the new transmission parameter. To prevent the base station 20 from retransmitting the PDCCH message indefinitely, the base station 20 starts a second timer (e.g. Timer 4) upon initially transmitting the PDCCH message. The expiration of the second timer may be used as a condition or trigger for the base station 20 to determine the status of the RRC connection. In that sense, at the expiration of the second timer, the base station 20 may determine whether the mobile terminal 30 has received the RRC connection modification message and modified its RRC connection parameters, or not, based on whether the mobile terminal 30 has transmitted a response during the time when the mobile terminal 30 was scheduled to transmit a response. In the illustrated embodiment, the base station 20 does receive a response from the mobile terminal 30 (step S212) since the mobile terminal 30 has previously modified the RRC connection parameters (step S208). The response may be a PUSCH message comprising some data transmitted to the base station 20. Upon determining the presence of the response (e.g. the PUSCH message) (step S214), the base station 20 may conclude that mobile terminal 30 has not only received the RRC connection modification message but also modified the RRC connection parameters (step S216). Upon reaching this conclusion, the base station 20 may perform certain actions, for instance, expect the upcoming reception of the RRC connection modification complete message transmitted according to the modified RRC connection parameters.

Figure 4B:
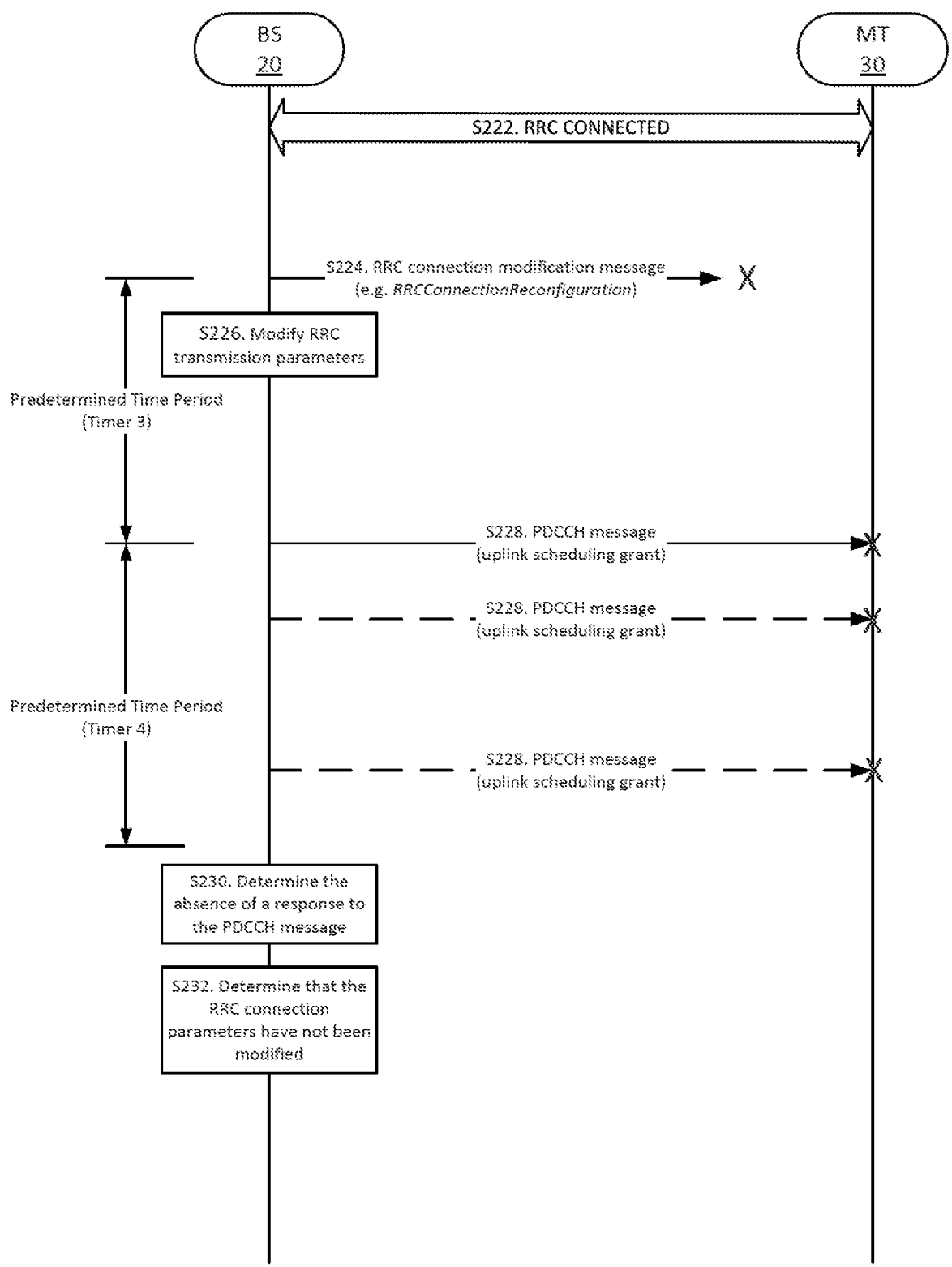

Referring now to FIG. 4B, a signaling diagram of another exemplary embodiment is illustrated. As shown, mobile terminal 30 is connected to the base station 20 and is therefore RRC_CONNECTED (step S222). As in FIG. 4A, at some point, the base station transmits an RRC connection modification message (e.g. RRCConnectionReconfiguration message) comprising one or more RRC connection parameters to be modified at the mobile terminal 30 (step S224). In the illustrated embodiment, for some reasons, the RRC connection modification message does not reach the mobile terminal 30. In such case, the mobile terminal 30 will continue using the previous RRC connection parameters.

In order to avoid waiting passively for either the RRC connection reconfiguration complete message or the RRC connection re-establishment request message from the mobile terminal 30, the base station 20 starts the first timer (e.g. Timer 3) upon initially transmitting the RRC connection modification message (step S224) but prior to locally modifying the RRC connection parameters (step S226). The expiration of the first timer, or the reception of a HARQ acknowledgement, may be used as a condition or trigger for the base station 20 to transmit the PDCCH message comprising the uplink scheduling grant to the mobile terminal 30 (step S228), the PDCCH message, which, in this case, is using the new transmission parameter. To prevent the base station 20 from retransmitting the PDCCH message indefinitely, the base station 20 starts the second timer (e.g. Timer 4) upon initially transmitting the PDCCH message. The expiration of the second timer may be used as a condition or trigger for the base station 20 to determine the status of the RRC connection. In that sense, at the expiration of the second timer, the base station 20 may determine whether the mobile terminal 30 has received the RRC connection modification message and modified its RRC connection parameters, or not, based on whether the mobile terminal 30 has transmitted a response during the time when the mobile terminal 30 was scheduled to transmit a response. In the illustrated embodiment, the base station 20 does not receive a response from the mobile terminal 30 since the mobile terminal 30 never received the RRC connection modification message. Upon determining the absence of a response (e.g. the PUSCH message) (step S230), the base station 20 may conclude that mobile terminal 30 did not receive the RRC connection modification message and that the RRC connection parameters have not been modified (step S232). Upon reaching this conclusion, the base station 20 may perform certain actions, for instance, restore the previous RRC connection parameters and expect the upcoming reception of the RRC connection re-establishment request message transmitted according to the previous RRC connection parameters. Alternatively, the base station 20 may retransmit, for further retransmit, the RRC connection modification message with the modified RRC connection parameters.

Figure 5A:
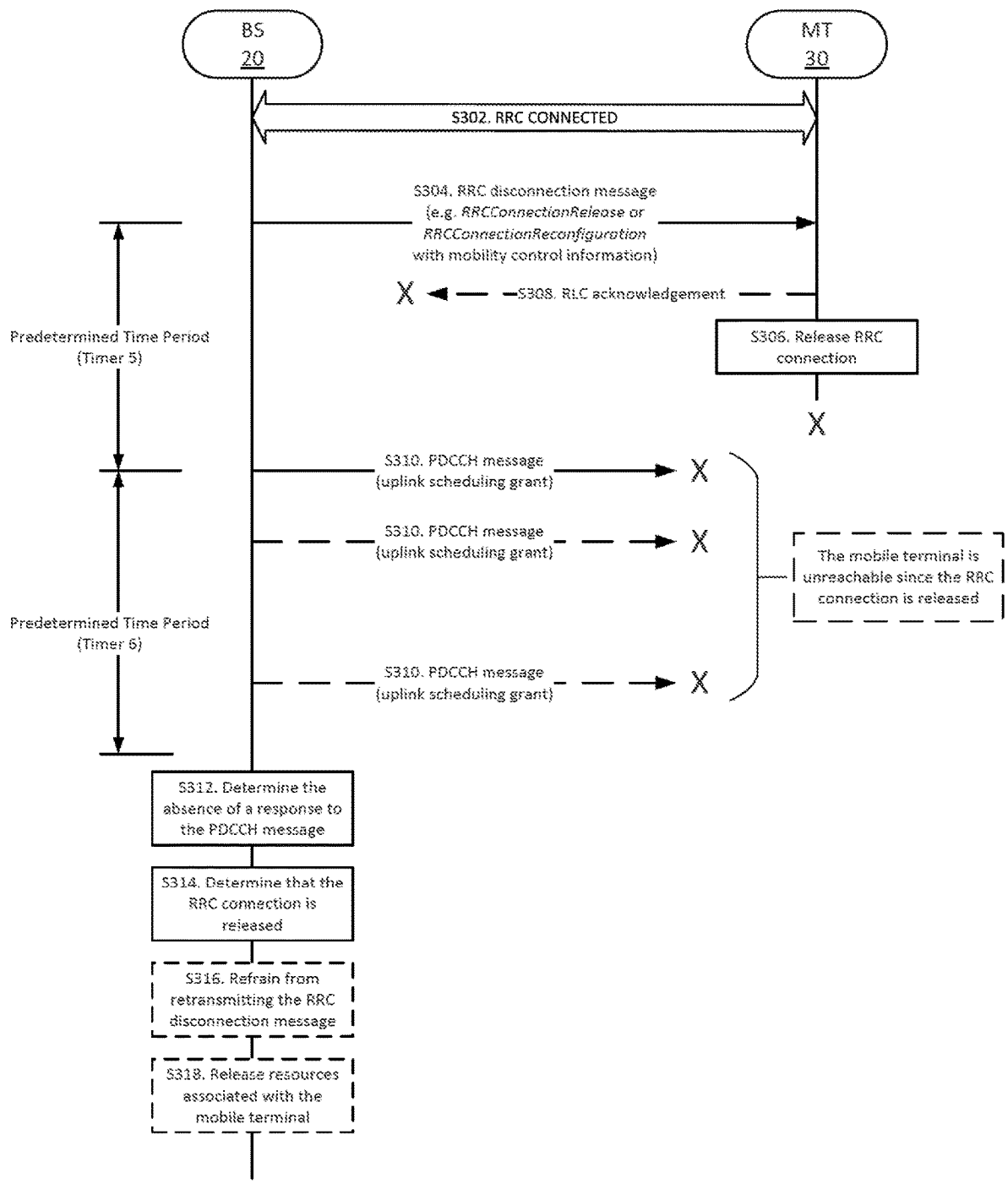

Referring now to FIG. 5A, a signaling diagram of another exemplary embodiment is illustrated. As shown, mobile terminal 30 is connected to the base station 20 and is therefore RRC_CONNECTED (step S302). At some point, the base station 20 transmits an RRC disconnection message to the mobile terminal 30, the RRC disconnection message comprises instructions which, upon being executed by the mobile terminal 30, would cause the existing RRC connection to be released (i.e. severed or broken) (step S304). The RRC disconnection message may be, for instance, an RRC-ConnectionRelease message or an RRCConnectionReconfiguration message including mobility control information.

In the illustrated embodiment, the mobile terminal 30 properly receives and processes the RRC disconnection message and ultimately releases the RRC connection (step S306). In the case of an RRCConnectionRelease message, the mobile terminal 30 may wait for a short while (e.g. 60 ms) before releasing the RRC connection and returning to the RRC_IDLE state. In the case of an RRCConnectionReconfiguration message with mobility control information, the mobile terminal 30 may be instructed to hand over to another base station 20. In such cases, the mobile terminal 30 may immediately release the existing RRC connection in order to establish another RRC connection with the target base station 20 as soon as possible.

Regardless, it may be possible for the base station 20 to never receive an acknowledgement from the mobile terminal 30 indicating the proper reception of the RRC disconnection message. Indeed, in some cases, the mobile terminal 30 may transmit an acknowledgement (e.g. an RLC ACK) but the acknowledgement may never reach the base station 20 due to, for instance, bad or degrading radio conditions (step S308). In such cases, by the time the mobile terminal 30 is due to retransmit the acknowledgement (e.g. the RLC ACK), the mobile terminal 30 may have already released the RRC connection. In some other cases, the mobile terminal 30 may simply release the RRC connection before sending the acknowledgement.

As illustrated, in order to avoid waiting passively for an acknowledgement from the mobile terminal 30, the base station 20 may start a first timer (e.g. Timer 5) upon first transmitting the RRC disconnection message. The expiration of the first timer, or the reception of a HARQ acknowledgement, may be used as a condition or trigger for the base station 20 to transmit the PDCCH message to the mobile terminal 30 (step S310), the PDCCH message comprising the uplink scheduling grant. Hence, as the first timer expires, the base station 20 transmits the PDCCH message to the mobile terminal 30 (step S310). Understandably, in the illustrated embodiment, the PDCCH message never reaches the mobile terminal 30 as the RRC connection between the mobile terminal 30 and the base station 20 has already been released. To prevent the base station 20 from retransmitting the PDCCH message indefinitely, the base station 20 starts a second timer (e.g. Timer 6) upon first transmitting the PDCCH message. The expiration of the second timer may be used as a condition or trigger for the base station 20 to determine the status of the RRC connection. In that sense, at the expiration of the second timer, the base station 20 may determine whether the mobile terminal 30 has received the RRC disconnection message, or not, based on whether the mobile terminal 30 has transmitted a response during the time when the mobile terminal 30 was scheduled to transmit a response. In the illustrated embodiment, the base station 20 determines an absence of response from the mobile terminal 30 within the time period defined by the second timer (step S312). Upon determining the absence of a response, the base station 20 may conclude that the mobile terminal 30 has received the RRC disconnection message and that the RRC connection between the base station 20 and the mobile terminal 30 is released (step S314). Upon reaching this conclusion, the base station 20 may perform certain actions, for instance, refraining from retransmitting, or further retransmitting, the RRC disconnection message (step S316). The base station 20 may also release resources associated with the mobile terminal 30 (step S318).

Figure 5B:
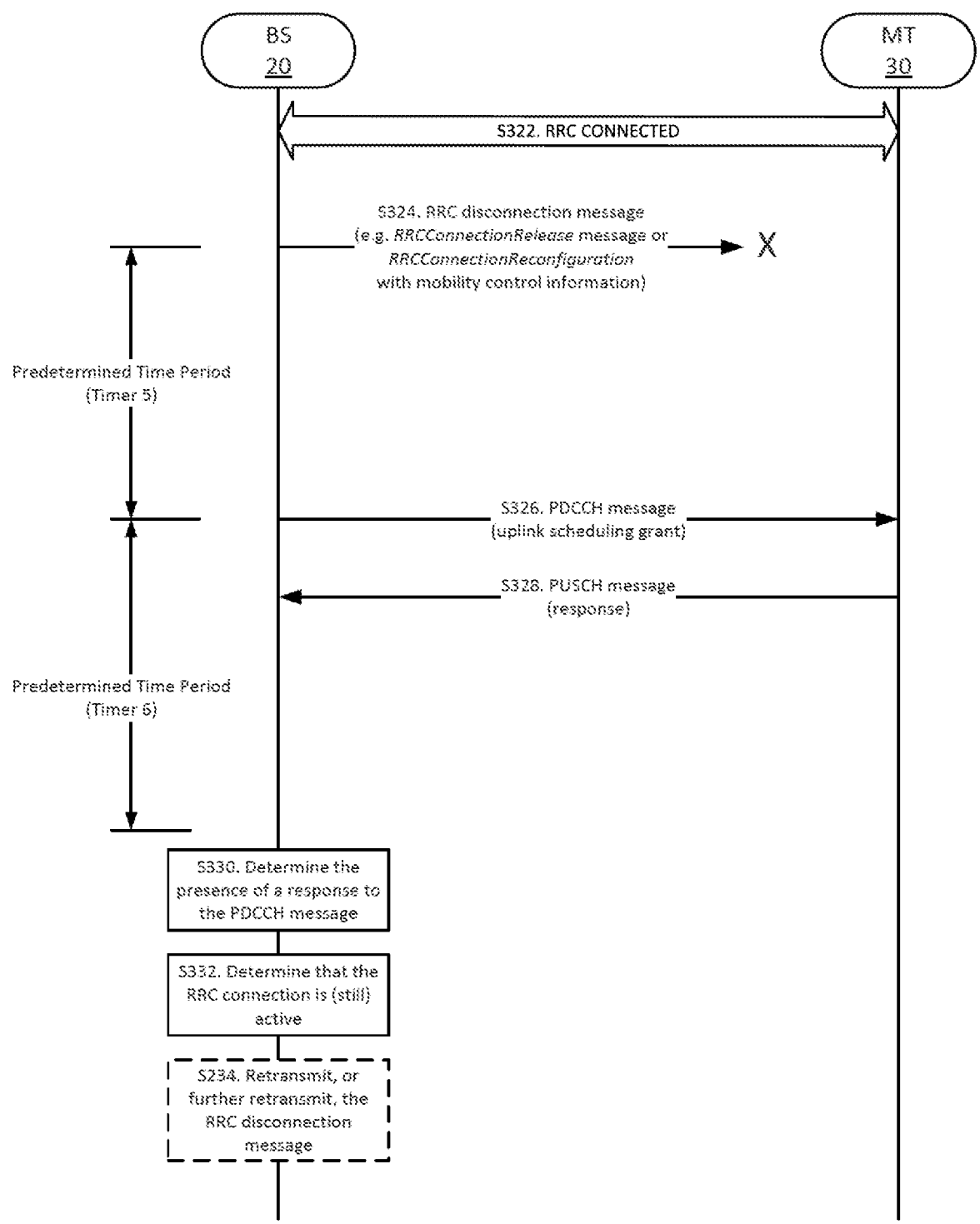

Referring now to FIG. 5B, a signaling diagram of another exemplary embodiment is illustrated. As in FIG. 5A, the mobile terminal 30 is connected to the base station 20 and is therefore RRC_CONNECTED (step S322). At some point, the base station 20 transmits an RRC disconnection message to the mobile terminal 30 (step S324). As in FIG. 5A, the RRC message may be, for instance, an RRCConnectionRelease message or an RRCConnectionReconfiguration message comprising mobility control information. In the illustrated embodiment however, the RRC disconnection message does not reach the mobile terminal 30. This may be due, for instance, to bad or degrading radio conditions. Regardless, since the mobile terminal 30 may release the RRC connection without notifying the base station 20, the base station 20 may not know whether the initial RRC disconnection message has been received, and processed, by the mobile terminal 30.

As illustrated, in order to avoid waiting passively for an acknowledgement from the mobile terminal 30, which may never come, the base station 20 starts the first timer (e.g. Timer 5) upon initially transmitting the RRC disconnection message. The expiration of the first timer, or the reception of a HARQ acknowledgement, may be used as a condition or trigger for the base station 20 to transmit the PDCCH message comprising the uplink scheduling grant to the mobile terminal 30 (step S326). Hence, as the first timer expires, the base station 20 transmits the PDCCH message to the mobile terminal 30 (step S326). Understandably, if the RRC disconnection message did not reach the mobile terminal 30, the mobile terminal 30 is unaware of the base station instruction. Then the PDCCH message may still reach the mobile terminal 30 as the RRC connection has not been released. To prevent the base station 20 from retransmitting the PDCCH message indefinitely, the base station 20 starts the second timer (e.g. Timer 6) upon initially transmitting the PDCCH message. The expiration of the second timer may be used as a condition or trigger for the base station 20 to determine the status of the RRC connection. In that sense, at the expiration of the second timer, the base station 20 may determine whether the mobile terminal 30 has received the RRC disconnection message, or not, based on whether the mobile terminal 30 has transmitted a response during the time when the mobile terminal 30 was scheduled to transmit a response. In the illustrated embodiment, the base station 20 does receive a response, the PUSCH message, from the mobile terminal 30 (step S330). Upon determining the presence of a response, the base station 20 may conclude that the RRC connection between the base station 20 and the mobile terminal 30 is (still) active (or at least not yet release released) (step S332). Upon reaching this conclusion, the base station 20 may perform certain actions, for instance, retransmitting, or further retransmitting, the RRC disconnection message (step S334).

The first and second timers used when transmitting an RRC disconnection message (e.g. Timers 5 and 6) may be chosen based, at least in part, on existing timer or timers used during the release of the RRC connection. For instance, the first and second timers may possibly be chosen to be cumulatively equal to, or longer, than a connection release timer started by the mobile terminal 30 upon receiving an RRC disconnection message. For instance, 3GPP TS 36.331 specifies that the mobile terminal 30 needs to delay the release of the RRC connection by 60 ms from the moment the mobile terminal receives the RRCConnectionRelease message. It will be appreciated that the first and second timers may themselves vary depending on the exact nature of the RRC disconnection message transmitted to the mobile terminal 30. For instance, the first timer may be different whether the RRC disconnection message is an RRCConnectionRelease message or an RRCConnectionReconfiguration message with mobility control information.

Understandably, if the base station 20 receives a lower layer acknowledgement (e.g. a MAC layer HARQ acknowledgement) from the mobile terminal 30 in response to the transmission of the initial RRC message before the expiration of the first timer (e.g. Timers 1, 3 or 5), the base station 20 may, or may not, wait for the expiration of the first timer to transmit the PDCCH message to the mobile terminal 30. Hence, in some embodiments, the base station 20 may transmit the PDCCH message to the mobile terminal 30 as soon as anyone of these conditions is met. Similarly, if the base station 20 receives a PUSCH message from the mobile terminal 30 in response to the transmission of the PDCCH message before the expiration of the second timer (e.g. Timers 2, 4 or 6), the base station 20 may, or may not, wait for the expiration of the second timer to determine the status of the RRC connection. Hence, in some embodiments, the base station 20 may determine the status of the RRC connection as soon as anyone of these conditions is met.

Figure 6:
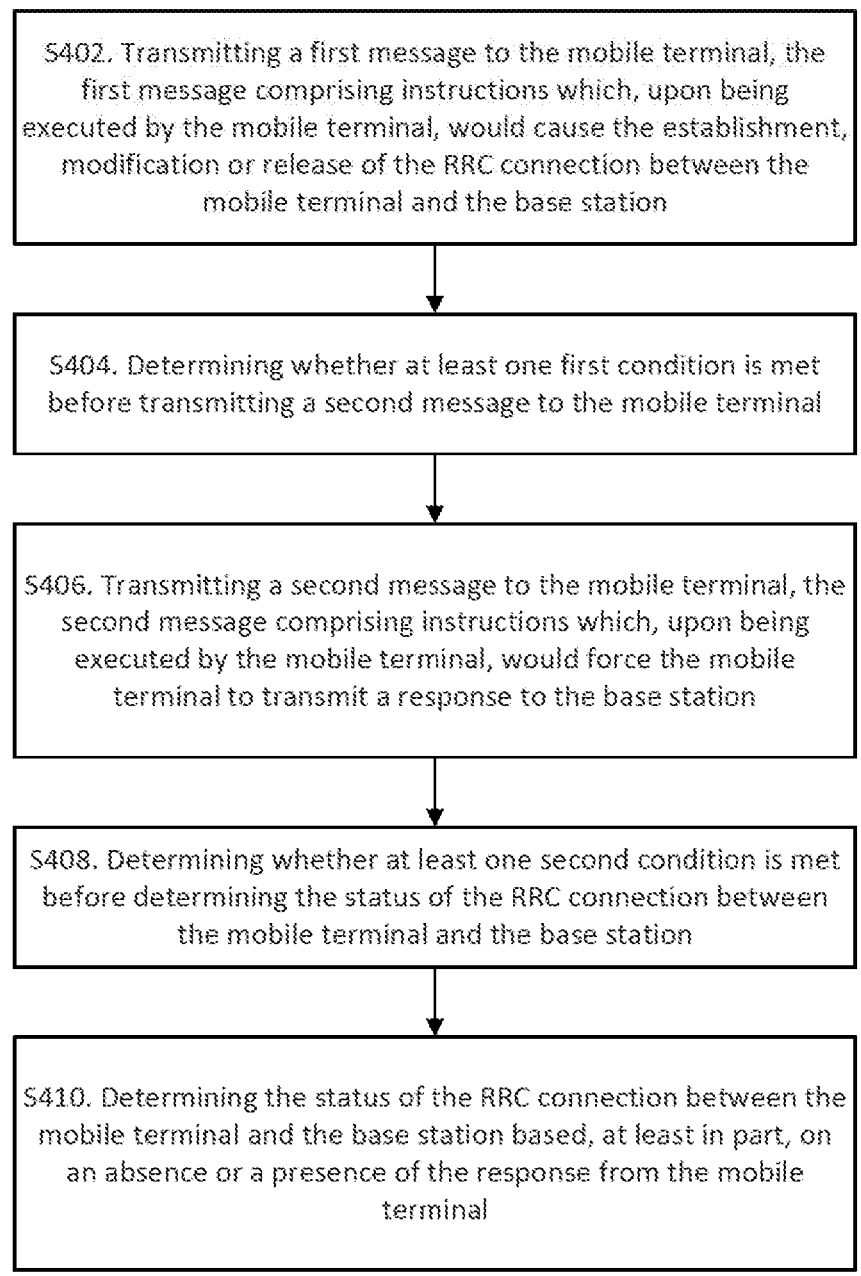
FIG. 6 illustrates a flowchart of some of the operations of a base station in accordance with some embodiments.

Turning now to FIG. 6, a flow chart comprising operations of an embodiment of a process, which may be carried out, for instance, by base station 20, is illustrated. From the perspective of the base station, the process starts when the base station transmits a first message to the mobile terminal (step S402). The first message comprises instructions which, upon being executed by the mobile terminal, would cause the establishment, the modification, or the release of an RRC connection between the mobile terminal and the base station. In some embodiments, the first message may be an RRC connection setup message such as an RRCConnectionSetup message. In some embodiments, the first message may be an RRC connection modification message such as an RRCConnectionReconfiguration message. In some embodiments, the first message may be an RRC disconnection message such as an RRCConnectionRelease message or an RRCConnectionReconfiguration message comprising mobility control information.

Regardless, the base station then determines whether at least one first condition is met before transmitting a second message to the mobile terminal (step S404). The at least one first condition may comprise the reception of a message from the mobile terminal acknowledging the reception of the RRC message (or a portion thereof). In some embodiments, the message may be a MAC layer HARQ acknowledgement or an RLC layer ARQ acknowledgement. The at least one first condition may additionally or alternatively comprise the expiration of a first timer started at the same time the first message was transmitted (e.g. Timers 1, 3 or 5).

Once the base station determines that the at least one first condition is met, the base station transmits the second message to the mobile terminal (step S406). The second message comprises instructions which, upon being executed by the mobile terminal, would force the mobile terminal to transmit a response to the base station. In some embodiments, the second message may be a downlink control channel message comprising, for instance, an uplink scheduling grant. In embodiments deployed according to LTE, the second message may be a PDCCH message carrying an uplink scheduling grant.

Subsequent to the transmission of the second message, the base station determines whether at least one second condition is met before determining the status of the RRC connection between the mobile terminal and the base station (step S408). The at least second condition may comprise the reception of a response from the mobile terminal transmitted responsive to reception of the second message (e.g. the PDCCH message). In some embodiments, the response may be a message transmitted over an uplink shared channel. In embodiments deployed according to LTE, the response may be a PUSCH message. The at least one second condition may additionally or alternatively comprise the expiration of a second timer started at the same time the second message was transmitted (e.g. Timers 2, 4 or 6).

The base station then determines the status of the RRC connection based, at least in part, on an absence or a presence of the response from the mobile terminal (step S410).

In the case the base station initially transmitted an RRC connection setup message, if the base station then receives a response from the mobile terminal (e.g. a PUSCH message received in response to the PDCCH message), the base station may conclude that the mobile has received the RRC connection setup message, and that the RRC connection has been established. If the base station does not receive any response from the mobile terminal, the base station may then conclude that the mobile terminal has not, or not yet, received the RRC connection setup message, and that the RRC connection has not (yet) been established.

In the case the base station initially transmitted an RRC connection modification message, if the base station then receives a response from the mobile terminal (e.g. a PUSCH message received in response to the PDCCH message), the base station may conclude that the mobile has received the RRC connection modification message, and that the RRC connection now uses the new RRC connection parameters. If the base station does not receive any response from the mobile terminal, the base station may then conclude that the mobile terminal has not, or not yet, received the RRC connection modification message, and that the RRC connection (still) uses the previous RRC connection parameters.

Finally, in the case the base station initially transmitted an RRC disconnection message, if the base station then receives a response from the mobile terminal (e.g. a PUSCH message received in response to the PDDCH message), the base station may conclude that the mobile terminal has not, or not yet, received the RRC disconnection message, and that the RRC connection is (still) active. If the base station does not receive any response from the mobile terminal, the base station may then conclude that the mobile terminal has received the RRC disconnection message, and that the RRC connection has been released.

It will be appreciated that how the base station interprets the presence, or absence, of a response to the second message depends, at least in part, on the nature of the RRC message initially transmitted. In addition, in some embodiments, the base station 20 may use one or more additional criteria, in addition to the presence or absence of the response to the second message, to determine the status of the RRC connection. For instance, in some embodiments, the base station 20 may also consider the content of the response, if any, to determine the status of the RRC connection. For example, if the response to the second message comprises an RLC status update (which may indicate whether the mobile terminal has received the RRC message), the base station 20 use the RLC status update, in addition to the presence or absence of the response to the second message, to determine the status of the RRC connection. In any case, by instructing the mobile terminal to reply to the second message, the base station may make an earlier determination of the status of the RRC connection and act accordingly.

Figure 8:
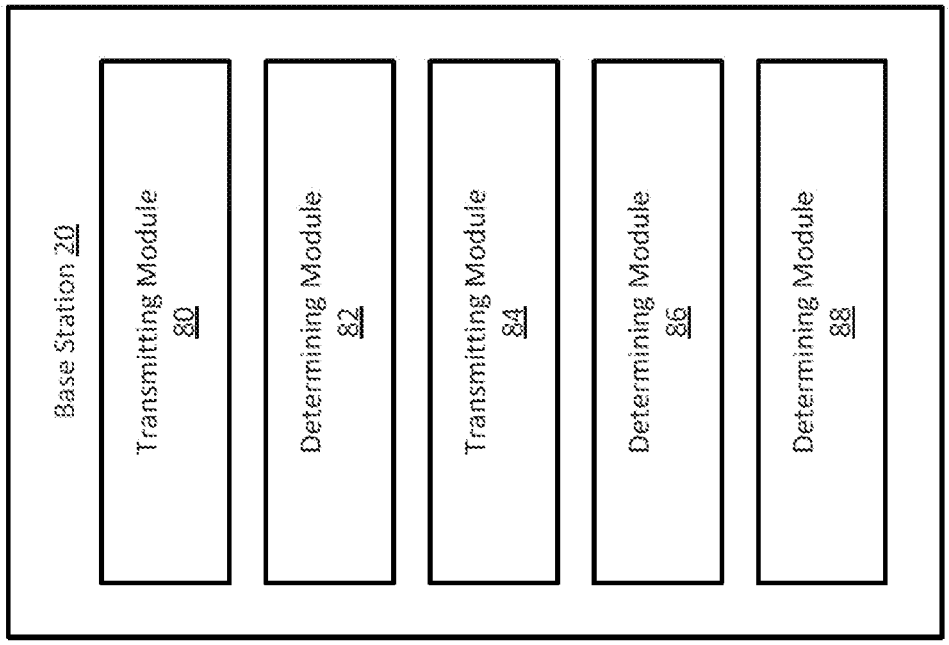
FIGS. 7 and 8 illustrate block diagrams of a base station in accordance with some embodiments.
Figure 7:
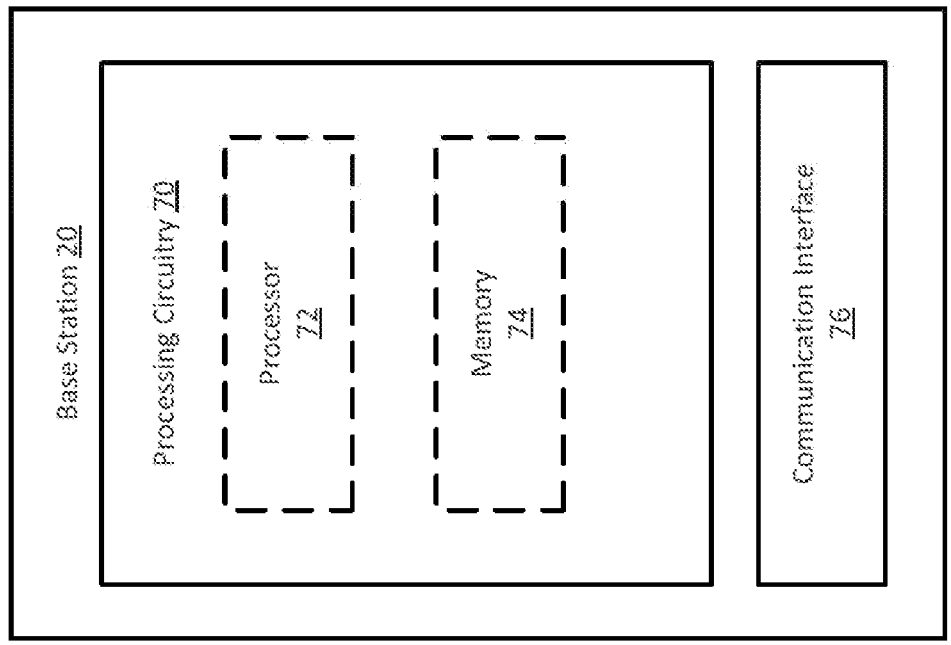

Referring now to FIGS. 7 and 8, block diagrams of embodiments of a base station such as base station 20 that can be used in one or more of the non-limiting example embodiments described are illustrated. In FIG. 7, the base station 20 comprises processing circuitry 70, which may comprise one or more processors 72, hardware circuits (e.g. application-specific integrated circuit (ASIC), field-programmable gate array (FPGA), etc.), firmware, or a combination thereof. Processing circuitry 70, in some embodiments, operates in conjunction with memory 74 that stores instructions for execution by one or more processors 72 of the processing circuitry 70. Memory 74 may comprise one or more volatile and/or non-volatile memory devices. Program code for controlling the overall operations of the base station 20 is, in some embodiments, stored in a non-volatile memory, such as a read-only memory or flash memory. Temporary data generated during operations may be stored in random access memory. The program code stored in memory, when executed by the processor 72 causes, or otherwise configures, the processor 72 to perform one or more of the methods described above in relation to the base station 20. The base station 20 also comprises one or more communication interfaces 76 for communicating with one or more mobile terminals 30 and/or one or more network nodes (e.g. other base stations 20, core network nodes, etc.). The communication interface(s) 76 may include transceiver circuitry that, for example, comprise transmitter circuitry and receiver circuitry that operate according to known communication standards (e.g. 3GPP standards, IEEE standards, etc.).

In FIG. 8, the base station 20 is shown as comprising a plurality of functional modules which may, in some embodiments, be implemented as hardware or software, or combination thereof. For instance, in some embodiments, the base station 20 comprises a transmitting module 80 configured to transmit a first message (e.g. an RRC message) to a mobile terminal (e.g. mobile terminal 30), the first message comprising instructions which, upon being executed by the mobile terminal, would cause the establishment, the modification, or the release of the RRC connection between the mobile terminal and the base station. The base station 20 also comprises a transmitting module 84 configured to transmit a second message (e.g. a downlink control channel message) to the mobile terminal, the second message comprising instructions which, upon being executed by the mobile terminal, would force the mobile terminal to transmit a response to the base station 20. The base station 20 also comprises a determining module 88 configured to determine the status of the RRC connection between the mobile terminal and the base station based, at least in part, on an absence or a presence of the response from the mobile terminal. In some embodiments, the base station 20 may also comprise a determining module 82 configured to determine whether at least one first condition has been met, and a determining module 86 configured to determine whether at least one second condition has been met.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

What is claimed is:

1. A method at a base station to determine a status of a radio resource control, RRC, connection between a mobile terminal and the base station, the method comprising:
   transmitting a first message to the mobile terminal, the first message comprising instructions for the mobile terminal to establish, modify, or release an RRC connection between the mobile terminal and the base station;
   upon transmitting the first message, starting a first timer;
   determining whether at least one first condition is met, wherein the at least one first condition comprises at least one of a reception of an acknowledgement of the reception of the first message and the expiration of the first timer;
   after determining that the at least one first condition is met, transmitting a second message to the mobile terminal, the second message comprising instructions for the mobile terminal to transmit a response to the base station; and
   determining the status of the RRC connection between the mobile terminal and the base station based, at least in part, on an absence or a presence of the response from the mobile terminal.

2. A method as claimed in claim 1, wherein the first message is an RRC message.

3. A method as claimed in claim 2, wherein the RRC message is one of an RRCConnectionSetup message, an RRCConnectionRelease message, and an RRCConnectionReconfiguration message.

4. A method as claimed in claim 1, wherein the acknowledgement of the reception of the first message comprises a Hybrid Automatic Repeat request, HARQ, acknowledgement.

5. A method as claimed in claim 1, further comprising determining whether at least one second condition is met before determining the status of the RRC connection between the mobile terminal and the base station.

6. A method as claimed in claim 5, wherein the at least one second condition comprises at least one of the reception of the response from the mobile terminal and the expiration of a second timer.

7. A method as claimed in claim 1, wherein the second message is a downlink control channel message.

8. A method as claimed in claim 7, wherein the downlink control channel message is a Physical Downlink Control Channel, PDCCH, message.

9. A method as claimed in claim 7, wherein the downlink control message comprises an uplink scheduling grant.

10. A base station configured to determine a status of a radio resource control, RRC, connection between a mobile terminal and the base station, the base station being configured to:
    transmit a first message to the mobile terminal, the first message comprising instructions for the mobile terminal to establish, modify, or release an RRC connection between the mobile terminal and the base station;
    upon transmitting the first message, start a first timer;
    determine whether at least one first condition is met, wherein the at least one first condition comprises at least one of a reception of an acknowledgement of the reception of the first message and the expiration of the first timer;
    after determining that the at least one first condition is met, transmit a second message to the mobile terminal, the second message comprising instructions for the mobile terminal to transmit a response to the base station;
    determine the status of the RRC connection between the mobile terminal and the base station based, at least in part, on an absence or a presence of the response from the mobile terminal.

11. A base station as claimed in claim 10, wherein the first message is an RRC message.

12. A base station as claimed in claim 11, wherein the RRC message is one of an RRCConnectionSetup message, an RRCConnectionRelease message, and an RRCConnectionReconfiguration message.

13. A base station as claimed in claim 10, wherein the acknowledgement of the reception of the first message comprises a Hybrid Automatic Repeat request, HARQ, acknowledgement.

14. A base station as claimed in claim 10, wherein the base station is further configured to determine whether at least one second condition is met before determining the status of the RRC connection between the mobile terminal and the base station.

15. A base station as claimed in claim 14, wherein the at least one second condition comprises at least one of the reception of the response from the mobile terminal and the expiration of a second timer.

16. A base station as claimed in claim 10, wherein the second message is a downlink control channel message.

17. A base station as claimed in claim 16, wherein the downlink control channel message is a Physical Downlink Control Channel, PDCCH, message.

18. A base station as claimed in claim 16, wherein the downlink control message comprises an uplink scheduling grant.

* * * * *